US012265669B2

(12) United States Patent  
Guo (10) Patent No.: US 12,265,669 B2  
(45) Date of Patent: Apr. 1, 2025

(54) PRESSURE TOUCH PAD, PRESSURE TOUCH PAD ASSEMBLY, AND ELECTRONIC DEVICE

(71) Applicant: SHENZHEN GOODIX TECHNOLOGY CO., LTD., Shenzhen (CN)

(72) Inventor: Yiping Guo, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/648,913

(22) Filed: Apr. 29, 2024

(65) Prior Publication Data

US 2024/0272736 A1 Aug. 15, 2024

Related U.S. Application Data

(63) Continuation of application No. PCT/CN2022/130719, filed on Nov. 8, 2022.

(30) Foreign Application Priority Data

Apr. 18, 2022 (CN) .......................... 202210406344.7

(51) Int. Cl.
G06F 3/041 (2006.01)
(52) U.S. Cl.
CPC ........ *G06F 3/0414* (2013.01); *G06F 3/04164* (2019.05)
(58) Field of Classification Search
None
See application file for complete search history.

(56) References Cited

U.S. PATENT DOCUMENTS 10,248,225 B1 4/2019 Tseng et al.
2012/0040721 A1* 2/2012 Infanti ................... G06F 3/016
345/173

(Continued)

FOREIGN PATENT DOCUMENTS

CN 105353923 A 2/2016
CN 108124385 A 6/2018
(Continued)

OTHER PUBLICATIONS

International search report of PCT/CN2022/130719 issued on Jan. 18, 2023.

*Primary Examiner* — Krishna P Neupane
(74) *Attorney, Agent, or Firm* — Emerson, Thomson & Bennett, LLC; Roger D. Emerson; Seth J. Niemi (57) ABSTRACT

A pressure touch pad, a pressure touch pad assembly, and an electronic device are provided. The pressure touch pad includes a printed circuit board, a pressure sensor, a pressure sensor bracket, and a touch controller. The printed circuit board is stacked on the pressure sensor bracket, a touch electrode layer is provided on the printed circuit board, the touch electrode layer is configured to output a touch sensing signal when a finger touches the touch pad; the pressure sensor is configured to deform and output a pressure sensing signal when the finger presses the pressure touch pad; and the pressure sensor bracket includes a reinforced region, a non-reinforced region, and a flexible arm, the reinforced region is fixedly connected to the printed circuit board, the non-reinforced region is fixedly connected to an outer case, and the flexible arm is connected to the reinforced region and the non-reinforced region.

20 Claims, 5 Drawing Sheets

(56) References Cited

U.S. PATENT DOCUMENTS

| | | | | |
|---|---|---|---|---|
| 2014/0002113 A1* | 1/2014 | Schediwy | ............ | G06F 3/0446 324/661 |
| 2014/0139442 A1* | 5/2014 | Clayton | ................ | G06F 3/041 345/173 |
| 2018/0081483 A1 | 3/2018 | Camp et al. | | |

FOREIGN PATENT DOCUMENTS

| | | |
|---|---|---|
| CN | 212322231 U | 1/2021 |
| CN | 112515386 A | 3/2021 |
| CN | 212675528 U | 3/2021 |
| CN | 112887456 A | 6/2021 |
| CN | 214225888 U | 9/2021 |
| CN | 113760127 A | 12/2021 |
| CN | 215494938 U | 1/2022 |
| CN | 114168003 A | 3/2022 |
| CN | 216052808 U | 3/2022 |
| CN | 114740999 A | 7/2022 |
| CN | 217467638 U | 9/2022 |
| WO | 2022027326 A1 | 2/2022 |

\* cited by examiner

PRESSURE TOUCH PAD, PRESSURE TOUCH PAD ASSEMBLY, AND ELECTRONIC DEVICE

CROSS REFERENCE

The present disclosure is a continuation of international application No. PCT/CN2022/130719, filed on Nov. 8, 2022, which claims priority to Chinese Patent Application No. 202210406344.7 titled "PRESSURE TOUCH PAD, PRESSURE TOUCH PAD ASSEMBLY, AND ELECTRONIC DEVICE" and filed with the China National Intellectual Property Administration on 18 Apr. 2022, both of which are incorporated herein by reference in their entireties.

TECHNICAL FIELD

Embodiments of the present disclosure relate to the technical field of touch control, and particularly relate to a pressure touch pad, a pressure touch pad assembly, and an electronic device.

BACKGROUND

A touch pad senses a position and movement of a user's finger through a touch sensor, and controls pointer movement on a display interface. A conventional touch pad uses a physical button to detect a user's pressing action, and execute a function, such as confirmation or invoking a menu. However, the user's pressing action can only be executed in a region below ½ of the touch pad, and cannot be executed in any region of a whole cover plate.

A pressure touch pad realizes operations such as confirmation and invoking a menu using pressure detection instead of physical button detection, thereby solving the problem that the conventional touch pad can only be locally pressed. The pressure touch pad can adjust response strength and vibration feedback strength of the user's pressing action based on user's use habits, thereby providing users with a more convenient and comfortable operating experience. The quality of the user experience largely depends on the structural design of the touch pad.

Therefore, how to improve the pressure detection performance of the touch pad to improve the user experience has become a to-be-solved problem.

SUMMARY

In view of this, the present disclosure provides a pressure touch pad, a pressure touch pad assembly, and an electronic device. The pressure touch pad has good pressure detection sensitivity, while improving the strength and rigidity of the touch pad, and reducing the sinkage amount of the touch pad when being pressed.

In an aspect, the present disclosure provides a pressure touch pad, including a printed circuit board, a pressure sensor, a pressure sensor bracket, and a touch controller; wherein the printed circuit board is stacked along a first direction on the pressure sensor bracket, a touch electrode layer is provided on one side of the printed circuit board away from the pressure sensor bracket, and the touch electrode layer is configured to, when a finger touches or presses the pressure touch pad, sense a touch position of the finger and output a corresponding touch sensing signal, wherein the first direction is a direction perpendicular to a plane of the pressure touch pad; the pressure sensor is arranged between the printed circuit board and the pressure sensor bracket, and is configured to, when the finger presses the pressure touch pad, deform and output a corresponding pressure sensing signal; the touch controller is arranged on one side of the printed circuit board facing the pressure sensor bracket, the touch controller is electrically connected to the touch sensor and the pressure sensor respectively, the touch controller is configured to receive the touch sensing signal and the pressure sensing signal, and determine the touch position of the finger on the touch pad and a magnitude of a pressure applied by the finger; and the pressure sensor bracket is configured to bear the printed circuit board and the pressure sensor, and fixedly connect the pressure touch pad to an outer case; wherein the pressure sensor bracket includes a reinforced region, a non-reinforced region, and a flexible arm, the reinforced region is fixedly connected to the printed circuit board, the non-reinforced region is configured to be fixedly connected to the outer case, the flexible arm is connected to the reinforced region and the non-reinforced region; the non-reinforced region is provided with a plurality of cantilever beams, the pressure sensor is provided on one side of the cantilever beams facing the printed circuit board, and the cantilever beam is connected to the printed circuit board through an elastic gasket.

The pressure touch pad provided in the present disclosure forms a gap between the touch pad and the outer case using the pressure sensor bracket, which is conductive to improving pressing hand feel of a user. The pressure sensor is placed on the cantilever beams formed by the non-reinforced region of the pressure sensor bracket. The reinforced region is connected to the non-reinforced region using the flexible arm, the reinforced region is fixedly connected to the printed circuit board, and the non-reinforced region is fixedly connected to the outer case, which is conductive to improving the overall strength and rigidity of the pressure touch pad, reducing the sinkage amount of the pressure touch pad when being pressed, and enabling the pressure touch pad to have the performance of high pressure detection sensitivity.

In the pressure touch pad as mentioned above, optionally, in a plane perpendicular to the first direction, a projection of the reinforced region is a closed structure, and the reinforced region is arranged around an outer side of the non-reinforced region.

In the pressure touch pad as mentioned above, optionally, an area of the reinforced region is at least 75% of an area of the pressure sensor bracket.

In the pressure touch pad as mentioned above, optionally, the first non-reinforced region includes a first connecting plate and a second connecting plate, the first connecting plate extends along a third direction, the second connecting plate extends along a second direction; one end of the first connecting plate facing an outer peripheral side of the pressure sensor bracket is connected to the second connecting plate, the other end of the first connecting plate is connected to the first flexible arm; the second non-reinforced region includes a third connecting plate and a fourth connecting plate, the third connecting plate extends along the third direction, the fourth connecting plate extends along the second direction; one end of the third connecting plate facing the outer peripheral side of the pressure sensor bracket is connected to the fourth connecting plate, and the other end of the third connecting plate is connected to the second flexible arm; wherein the third direction is a direction along a long side of the pressure touch pad, and the second direction is a direction along a short side of the pressure touch pad.

In the pressure touch pad as mentioned above, optionally, the plurality of cantilever beams include a first cantilever beam, a second cantilever beam, a third cantilever beam, and a fourth cantilever beam. Specifically, two ends of the second connecting plate is configured to form the first cantilever beam and the second cantilever beam respectively; and two ends of the fourth connecting plate is configured to form the third cantilever beam and the fourth cantilever beam respectively.

In the pressure touch pad as mentioned above, optionally, the non-reinforced region includes a first fixing hole, a second fixing hole, a fourth fixing hole, and a fifth fixing hole; in the first non-reinforced region, the first fixing hole is provided at one end of the second connecting plate to form a fixed end of the first cantilever beam, and the second fixing hole is provided at the other end of the second connecting plate to form a fixed end of the second cantilever beam; and in the second non-reinforced region, the fourth fixing hole is provided at one end of the fourth connecting plate to form a fixed end of the third cantilever beam, and the fifth fixing hole is provided at the other end of the four connecting plate to form a fixed end of the fourth cantilever beam.

In the pressure touch pad as mentioned above, optionally, the non-reinforced region further includes a third fixing hole and a sixth fixing hole; in the first non-reinforced region, the third fixing hole is provided at one end of the first connecting plate connected to the first flexible arm; and in the second non-reinforced region, the sixth fixing hole is provided at one end of the third connecting plate connected to the second flexible arm.

In the pressure touch pad as mentioned above, optionally, the pressure sensor bracket is a stainless steel bracket with a hardness of ¾.

In the pressure touch pad as mentioned above, optionally, the pressure touch pad further includes: an actuator, wherein the actuator includes a linear motor, an actuator avoidance hole is provided at a center of the pressure sensor bracket, and the actuator avoidance hole is used to avoid the actuator; and a cover plate, wherein the cover plate is stacked along the first direction on one side of the printed circuit board away from the pressure sensor bracket, the cover plate and the printed circuit board are adhesively fixed through a first adhesive layer, and the printed circuit board and the reinforced region are adhesively fixed through a second adhesive layer.

In another aspect, the present disclosure provides a pressure touch pad assembly, including a module fixing bracket and the pressure touch pad according to any one of the above embodiments, wherein the pressure touch pad is installed along the first direction on the module fixing bracket.

In the pressure touch pad assembly as mentioned above, optionally, a limiting protrusion is provided on one side of the module fixing bracket facing the pressure sensor bracket, and along the first direction, a thickness of the limiting protrusion is smaller than a thickness of the elastic gasket in a free state.

In the pressure touch pad assembly as mentioned above, optionally, the limiting protrusion is provided on an outer peripheral side of the module fixing bracket.

In the pressure touch pad assembly as mentioned above, optionally, the limiting protrusion includes a plurality of protruding parts, among which, at least two adjacent protruding parts are connected to each other, or at least two adjacent protruding pars are spaced apart.

In the pressure touch pad assembly as mentioned above, optionally, the plurality of protruding parts include a first protruding part, a second protruding part, a third protruding part, and a fourth protruding part, the first protruding part and the third protruding part extend along the second direction, and the second protruding part and the fourth protruding part extend along the third direction.

In the pressure touch pad assembly as mentioned above, optionally, the plurality of protruding parts include a first protruding part, a second protruding part, a third protruding part, and a fourth protruding part, the first protruding part and the third protruding part extend along the second direction, and the second protruding part and the fourth protruding part extend along the third direction; the first protruding part, the second protruding part, and the third protruding part are sequentially connected end to end, and the fourth protruding part is spaced apart from the first protruding part and the third protruding part.

In the pressure touch pad assembly as mentioned above, optionally, the module fixing bracket is provided with a limiting groove corresponding to the cantilever beam; and the limiting groove is located within an area enclosed by the first protruding part, the second protruding part, the third protruding part, and the fourth protruding part.

In the pressure touch pad assembly as mentioned above, optionally, along the first direction, the thickness of the limiting protrusion is 0.25-0.35 mm.

In the pressure touch pad assembly as mentioned above, optionally, the pressure touch pad assembly further includes a module support bracket, the module support bracket is arranged on one side of the module fixing bracket away from a pressure touch pad module and is located at one end of the module fixing bracket; and the module support bracket is integrally formed with the module fixing bracket.

In the pressure touch pad assembly as mentioned above, optionally, a plurality of first fixing holes are provided in the non-reinforced region, a plurality of first connection holes are provided on the module fixing bracket, there is one-to-one correspondence between the plurality of first fixing holes and the plurality of first connection holes, and a fastener is, after running through a corresponding first connection holes, fixed in a corresponding first fixing hole.

In still another aspect, the present disclosure provides an electronic device, including a housing C, wherein a mounting port is provided on the housing C, and the pressure touch pad assembly according to any one of the above embodiments is provided in the mounting port.

The present disclosure provides a pressure touch pad, a pressure touch pad assembly, and an electronic device. The pressure touch pad includes a pressure touch pad module, and the pressure touch pad module includes a touch sensor, a printed circuit board, a pressure sensor, a pressure sensor bracket, and a touch controller; wherein the printed circuit board is stacked along a first direction on the pressure sensor bracket, the touch sensor, the pressure sensor, and the touch controller are all arranged on the printed circuit board; the touch sensor is arranged on one side of the printed circuit board away from the pressure sensor bracket, the touch sensor is configured to, when a finger touches or presses the pressure touch pad, sense a touch position of the finger and output a corresponding touch sensing signal; the pressure sensor is configured to deform under a pressure applied by the finger when pressing the pressure touch pad and output a corresponding pressure sensing signal; the touch controller is arranged on one side of the printed circuit board facing the pressure sensor bracket, the touch controller is electrically connected to the touch sensor and the pressure sensor, the touch controller is configured to receive the touch sensing signal and the pressure sensing signal, and determine the touch position of the finger on the touch pad and a magnitude of the pressure applied by the finger; the pressure sensor bracket is configured to bear the printed circuit board, and install the pressure touch pad module to a module fixing bracket, an electronic element avoidance hole is provided on the pressure sensor bracket, the electronic element avoidance hole is configured to accommodate the touch controller; the pressure sensor bracket includes a reinforced region, a non-reinforced region, and a flexible arm, wherein the reinforced region is fixedly connected to the printed circuit board, the non-reinforced region is configured to be fixedly connected to the module fixing bracket, the flexible arm is connected to the reinforced region and the non-reinforced region; and the non-reinforced region is provided with a plurality of cantilever beams, the pressure sensor is provided on one side of the cantilever beams facing the printed circuit board, and the cantilever beam is connected to the printed circuit board through an elastic gasket. In the present disclosure, the pressure sensor bracket is provided, and the pressure sensor bracket includes a reinforced region, a non-reinforced region, and a flexible arm, wherein the reinforced region is fixedly connected to the printed circuit board, and the non-reinforced region is configured to be fixedly connected to the module fixing bracket, which is conductive to improving the overall strength and rigidity of the pressure touch pad module, reducing the sinkage amount of the pressure touch pad when being pressed, and improving the user experience.

BRIEF DESCRIPTION OF DRAWINGS

In order to more clearly describe technical solutions of embodiments of the present disclosure or the prior art, drawings to be used in the description of the embodiments or the prior art will be briefly introduced below. Apparently, the drawings described below are some embodiments of the present disclosure. For those of ordinary skills in the art, other drawings may also be obtained based on these drawings without making creative work.

DESCRIPTION OF EMBODIMENTS

In order to make the objectives, technical solutions, and advantages of embodiments of the present disclosure clearer, the technical solutions in the embodiments of the present disclosure will be clearly and completely described below with reference to the drawings in the embodiments of the present disclosure. Apparently, the embodiments described below are some, instead of all, of the embodiments of the present disclosure. Based on the embodiments in the present disclosure, all other embodiments obtained by those of ordinary skills in the art without making creative work are encompassed within the scope of protection of the present disclosure.

The contents of the embodiments of the present disclosure will be described in detail below with reference to the drawings, so that those skilled in the art can understand the contents of the present disclosure in more detail.

Figure 1:
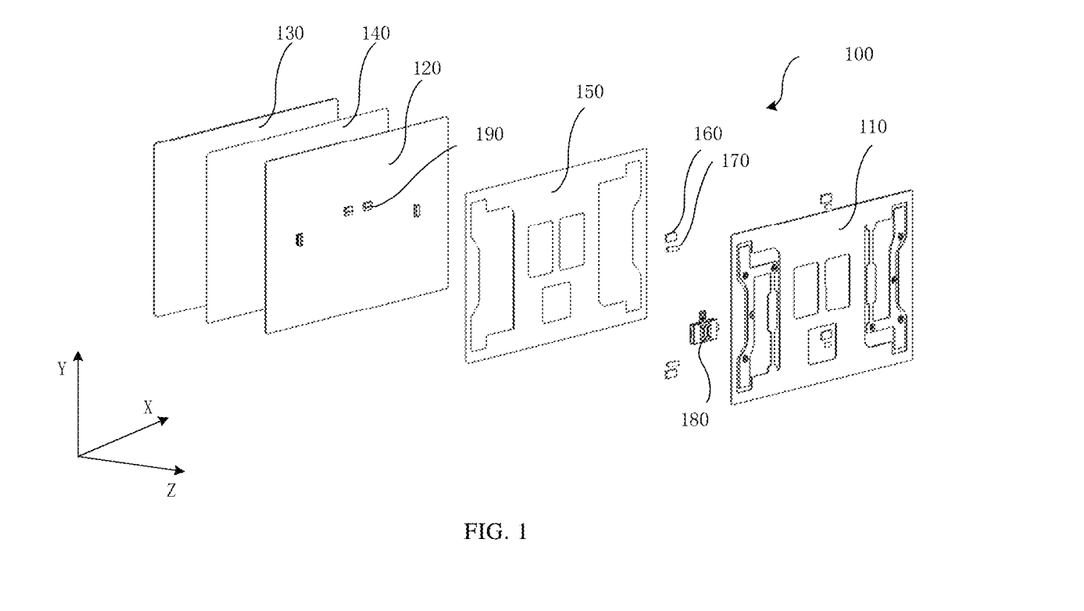
FIG. 1 is an exploded view of a pressure touch pad provided in an embodiment of the present disclosure.
Figure 2:
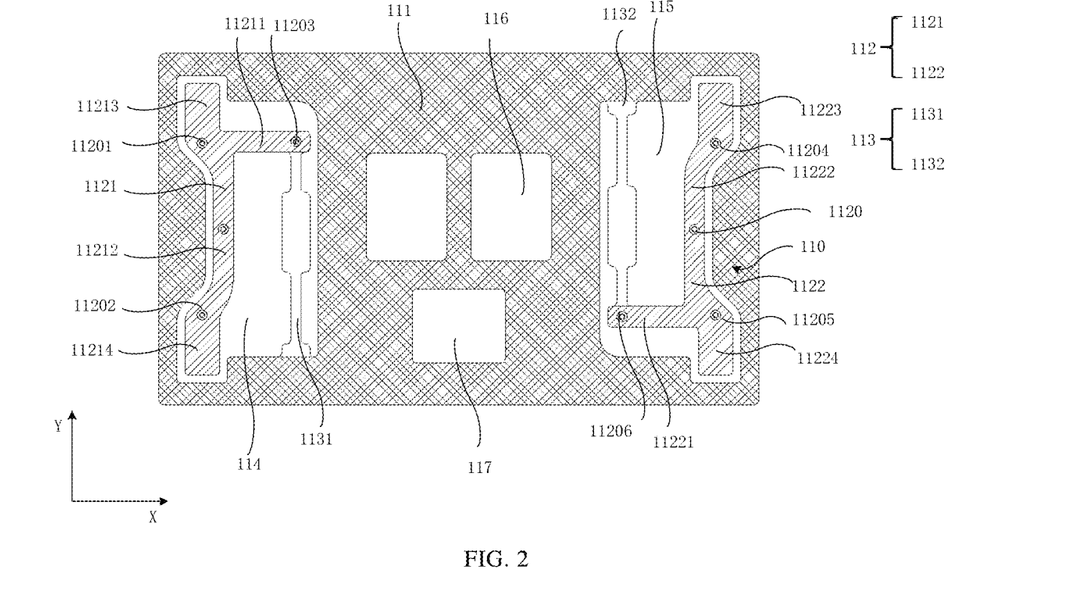
FIG. 2 is a schematic structural diagram of a pressure sensor bracket provided in an embodiment of the present disclosure.

FIG. 1 is an exploded view of a pressure touch pad module provided in an embodiment of the present disclosure; and FIG. 2 is a schematic structural diagram of a pressure sensor bracket provided in an embodiment of the present disclosure. Referring to FIGS. 1-2, the present embodiment provides a pressure touch pad module 100 (hereinafter referred to as "pressure touch pad" or "touch pad") including a cover plate 130, a printed circuit board 120, a pressure sensor 170, and a pressure sensor bracket 110 that are sequentially arranged along a first direction Z.

The cover plate 130 may specifically be a glass cover plate or other protective cover plate, and is mainly configured to provide an input surface for finger touch or pressing, and protect the printed circuit board 120 and the pressure sensor 170 on one side of the cover plate 130 facing the pressure sensor bracket 110, that is, protecting the printed circuit board 120 and the pressure sensor 170 below the cover plate 130. In terms of specific operations, a user may touch or move the input surface provided by the cover plate 130 with a finger to control an electronic device to execute instructions related to the touch operation or to move a pointer on a display interface of the electronic device. Further, when touching or moving the cover plate 130, the finger may press the cover plate 130 synchronously to apply a downward pressure to the touch pad 100, to control the electronic device to execute instructions related to the pressing operation. It should be understood that while a glass cover plate or a protective cover plate is used as an example in the present embodiment, in some particular application scenarios, the cover plate 130 may further be other functional components of the electronic device, such as a component with a display function.

The printed circuit board 120 is fixedly connected to the cover plate 130 through a first adhesive layer 140. A touch electrode layer is provided on one side of the printed circuit board 120 away from the pressure sensor bracket 110, that is, the touch electrode layer is laid on an upper surface of the printed circuit board 120. The touch electrode layer is mainly configured to detect a touch position of the finger on the cover plate 130 and movement of the finger on the cover plate 130, and output position coordinate information of the finger touch or dynamic vector information generated by the finger movement to a master controller of the electronic device. It not only can bear and support the touch electrode layer, but also can carry an electronic component and a circuit of the pressure touch pad. The electronic component includes, for example, a touch controller 190 and an actuator 180. The touch controller 190 is installed on a lower surface of the printed circuit board 120, is electrically connected to the touch electrode layer and the pressure sensor 170 through a connection wire of the printed circuit board 120, and is configured not only to provide a drive signal to the touch electrode layer to drive capacitive touch detection, but also to receive a touch sensing signal outputted from the touch electrode layer and a pressure sensing signal outputted from the pressure sensor 170 when the finger presses the touch pad 100, and to determine position information of the finger and a magnitude of a pressure applied by the finger based on the touch sensing signal and the pressure sensing signal. Further, the touch controller 190 may further be connected to the actuator 180, and is further configured to drive the actuator 180 to provide vibration feedback in response to the magnitude of the detected pressure. In a specific embodiment, the touch controller 190 may be a touch control chip that integrates pressure detection and touch position detection, or may include two separately arranged pressure detection chips for detecting a pressure and touch control chips for detecting a touch position. The actuator 180 may be a linear motor.

The pressure sensor 170 is a resistive pressure sensor, is also referred to as a piezoresistive force sensor, and is arranged between the printed circuit board 120 and the pressure sensor bracket 110. As an embodiment, the pressure sensor 170 may be a strain gauge arranged on a cantilever beam of the pressure sensor bracket 110. The cantilever beam is bonded to the lower surface of the printed circuit board 120 through an elastic gasket 160; and the pressure applied by the finger when pressing the touch pad 100 can be transmitted to the strain gauge through the cantilever beam, so that the strain gauge deforms, thereby resulting in resistance value changes. The magnitude of the pressure can be computed based on the resistance value changes.

The pressure sensor bracket 110 may be a metal bracket configured to provide support for the pressure sensor 170 and install the touch pad 100 to an outer case. Moreover, the pressure sensor bracket 110 supports the printed circuit board 120, increases the hardness of the touch pad 100, and prevents the touch pad 100 from collapse when being pressed. The pressure sensor bracket 110 is provided with a reinforced region 111, a non-reinforced region 112, and a flexible arm 113. The reinforced region 111 includes a partial region of the pressure sensor bracket 110 fixedly connected to the printed circuit board 120; the non-reinforced region 112 includes a partial region of the pressure sensor bracket 110 configured to be fixedly connected to the outer case, for example, the outer case may include a module fixing bracket; and the flexible arm 113 is a connecting arm between the reinforced region 111 and the non-reinforced region 112, for example, a flexible connecting arm.

The reinforced region 111 of the pressure sensor bracket 110 is fixedly connected to the printed circuit board 120 through a second adhesive layer 150. The reinforced region 111 supports the printed circuit board 120, and increases the hardness of the touch pad 100. In a plane perpendicular to the first direction Z, the reinforced region 111 is arranged around an outer side of the non-reinforced region 112; a projection of the reinforced region 111 is a closed structure, and the reinforced region 111 is set to be a closed structure, which is conductive to improving support area of the pressure sensor bracket 110 for the cover plate 130 and the printed circuit board 120, improving the rigidity of the touch pad 100 itself, and preventing the touch pad 100 from collapse when the finger presses an upper surface of the cover plate 130.

In an implementation, the pressure sensor bracket 110 is provided with a first opening part 114 and a second opening part 115, and the first opening part 114 and the second opening part 115 are arranged respectively close to both sides of the pressure sensor bracket 110 along a third direction X. The non-reinforced region 112 includes a first non-reinforced region 1121 arranged in the first opening part 114 and a second non-reinforced region 1122 arranged in the second opening part 115. The first non-reinforced region 1121 includes a first connecting plate 11211 and a second connecting plate 11212. The first connecting plate 11211 extends along the third direction X, the second connecting plate 11212 extends along a second direction Y; and a first cantilever beam 11213 and a second cantilever beam 11214 are formed at both ends of the second connecting plate 11212 respectively. The first cantilever beam 11213 is connected to the printed circuit board 120 through an elastic gasket 160, and the second cantilever beam 11214 is connected to the printed circuit board 120 through an elastic gasket 160, thereby forming a gap between the first cantilever beam 11213 and the printed circuit board 120 and a gap between the second cantilever beam 11214 and the printed circuit board. The second non-reinforced region 1122 includes a third connecting plate 11221 and a fourth connecting plate 11222. The third connecting plate 11221 extends along the third direction X, the fourth connecting plate 11222 extends along the second direction Y; and a third cantilever beam 11223 and a fourth cantilever beam 11224 are formed at both ends the fourth connecting plate 11222 respectively. The third cantilever beam 11223 is connected to the printed circuit board 120 through an elastic gasket 160, and the fourth cantilever beam 11224 is connected to the printed circuit board 120 through an elastic gasket 160, thereby forming a gap between the third cantilever beam 11223 and the printed circuit board 120 and a gap between the fourth cantilever beam 11224 and the printed circuit board. The elastic gasket 160 may be a gasket with elasticity and flexibility, for example, may be a silicone gasket, a spring, or the like. It can be understood that due to the existence of the elastic gasket 160, the non-reinforced region 112 is supported for a certain distance in the first direction Z, thereby forming a gap between the non-reinforced region 112 and the printed circuit board 120. The four cantilever beams 1121 of the non-reinforced region 112 are arranged close to four corners of the pressure sensor bracket 110 respectively, and the pressure sensor 170 is arranged on one side of the four cantilever beams 1121 away from the pressure sensor bracket 110, so that a pressure can be accurately detected when a finger presses the touch pad at any position. When the finger presses the touch pad, the touch pad 100 moves in a direction towards the pressure sensor bracket 110, the gap between the non-reinforced region 112 and the printed circuit board 120 is reduced, and the pressure is transmitted through the elastic gasket 160 to the cantilever beam 1121, resulting in a deformation. The pressure sensor 170 deforms accordingly, which then causes resistance value changes of the pressure sensor 170. The magnitude of the pressure can be computed based on the resistance value changes. After the pressure is removed, the gap restores to its initial state under the resilience of the elastic gasket itself. The structural design of the pressure sensor bracket 110 improves pressing hand feel of the user while ensuring the detection accuracy of the pressure sensor 170.

The non-reinforced region 112 is provided with a plurality of non-reinforced region fixing holes 1120. Each of the non-reinforced region fixing holes 1120 corresponds to a fastener, and is configured to fixedly connect the non-reinforced region 112 to the outer case, to fix the pressure sensor bracket 110 to the outer case. Specifically, the non-reinforced region fixing holes 1120 include a first fixing hole 11201, a second fixing hole 11202, a third fixing hole 11203, a fourth fixing hole 11204, a fifth fixing hole 11205, and a sixth fixing hole 11206. In the first non-reinforced region 1121, the third fixing hole 11203 is provided at one end of the first connecting plate 11201 connected to a first flexible arm 1131 (that is, at one end of the first connecting plate 11201 away from an outer peripheral side of the pressure sensor bracket 110), the first fixing hole 11201 is provided at one end of the second connecting plate 11212 to form a fixed end of the first cantilever beam 11213, and the second fixing hole 11202 is provided at the other end of the second connecting plate 11212 to form a fixed end of the second cantilever beam 11214. Similarly, in the second non-reinforced region 1122, the sixth fixing hole 11206 is provided at one end of the third connecting plate 11221 for connected to a second flexible arm 1132 (that is, at one end of the third connecting plate 11221 away from the outer peripheral side of the pressure sensor bracket 110), the fourth fixing hole 11204 is provided at one end of the fourth connecting plate 11222 to form a fixed end of the third cantilever beam 11223, and the fifth fixing hole 11205 is provided at the other end of the fourth connecting plate 11222 to form a fixed end of the fourth cantilever beam 11224. Such an arrangement ensures, when the finger presses the upper surface of the cover plate 130, the effectiveness and timeliness of transmission of the pressing force of the finger by the cantilever beams, is conducive to improving the pressure detection accuracy of the touch pad 100, and can further ensure the connection stability between the non-reinforced region and the outer case.

The flexible arm 113 includes the first flexible arm 1131 arranged in the first opening part 114 and the second flexible arm 1132 arranged in the second opening part 115; wherein both ends of the first flexible arm 1131 are connected to the first non-reinforced region 1121 and the reinforced region 111 respectively, and both ends of the second flexible arm 1132 are connected to the second non-reinforced region 1122 and the reinforced region 111 respectively. The first flexible arm 1131 is connected to one end of the first connecting plate 11211 in the first non-reinforced region 1121 (that is, one end of the first connecting plate 11201 away from the outer peripheral side of the pressure sensor bracket 110), and the other end of the first connecting plate 11211 is connected to the second connecting plate 11212. The second flexible arm 1132 is connected to one end of the third connecting plate 11221 in the second non-reinforced region 1122 (that is, one end of the third connecting plate 11221 away from the outer peripheral side of the pressure sensor bracket 110), and the other end of the third connecting plate 11221 is connected to the fourth connecting plate 11222.

The second non-reinforced region 1122 and the second flexible arm 1132 may be structures formed by rotating the first non-reinforced region 1121 and the first flexible arm 1131 by 180 degrees respectively.

Further, an area of the reinforced region 111 is set to be at least 75% of an area of the pressure sensor bracket 110. Through the setting of this particular size, the pressure sensor bracket 110 can better support the cover plate while ensuring the detection accuracy of the pressure sensor. In addition, increase of the area of the reinforced region 111 is conducive to reducing the area of the non-reinforced region 112, and is thus conducive to reducing the number of to-be-used fasteners.

It should be understood that the third direction X is a direction along a long side of the pressure touch pad 100, the second direction Y is a direction along a short side of the pressure touch pad 100, and the first direction Z is a direction perpendicular to a plane of the pressure touch pad 100.

In order to improve the rigidity of the pressure touch pad 100 itself, in the present embodiment, each of the first adhesive layer 140 and the second adhesive layer 150 is optionally a low-temperature thermosetting adhesive layer.

Specifically, the low-temperature thermosetting adhesive layer is a polyurethane base layer, an acrylic acid layer, or an epoxy base layer; a bonding temperature of the low-temperature thermosetting adhesive layer is 60-85°, curing time of the low-temperature thermosetting adhesive layer is 100-300 s; and a shear strength of the low-temperature thermosetting adhesive layer is greater than 9 MPa, thereby ensuring that the assembled touch pad 100 itself has strong rigidity, and reducing the deformation amount when the touch pad is pressed.

Further, in the present embodiment, the pressure sensor bracket 110 is optionally a stainless steel bracket with a hardness of ¾, which is conductive to improving the rigidity of the pressure sensor bracket 110 itself, and reducing the deformation amount of the touch pad 100 when being pressed.

The pressure sensor bracket 110 further includes a touch controller avoidance hole 116 and an actuator avoidance hole 117. The touch controller avoidance hole 116 and the actuator avoidance hole 117 are both arranged in a center part of the pressure sensor bracket 110, that is, sandwiched between the first opening part 114 and the second opening part 115 to avoid the touch sensor 190 and the actuator 180 respectively, so that the touch sensor 190 and the actuator 180 are arranged on the lower surface of the printed circuit board 120 respectively, which is conductive to reducing the thickness of the touch pad 100. Arranging the reinforced region 111 around the touch controller avoidance hole 116 and the actuator avoidance hole 117 is conductive to improving the rigidity around the touch controller avoidance hole 116 and the actuator avoidance hole 117. In an implementation, the actuator 180 is a linear motor, and the actuator avoidance hole 117 is arranged at a center of the pressure sensor bracket 110, so that the actuator 180 is arranged at a center of the printed circuit board 120, which can improve the vibration effects of the touch pad.

Through the above arrangement of the pressure sensor bracket 110, the non-reinforced region 112 is fixedly connected to the outer case, and the reinforced region 111 is fixedly connected to the printed circuit board 120, so that the non-reinforced region 112 and the reinforced region 111 form a certain gap. Due to the existence of the flexible arm 113, the non-reinforced region 112 and the reinforced region 111 still maintain a connection relationship. Therefore, there is a certain gap between the touch pad 100 and the outer case. The finger presses the cover plate 130 to apply a downward pressure to the touch pad 100. The touch pad 100 moves along the first direction Z in the gap, and the pressure can be transmitted to the pressure sensor 170 through the reinforced region 111, the non-reinforced region 112, and the flexible arm 113 of the pressure sensor bracket 110, thereby enabling the pressure sensor 170 to deform, then resulting in resistance value changes, computing the magnitude of the pressure based on the resistance value changes, and further providing tactile feedback. The touch pad 100 provided in the present embodiment has high pressure detection sensitivity, good pressing hand feel, high hardness, and the performance of preventing collapse when being pressed, which are conductive to improving the user experience.

Figure 3:
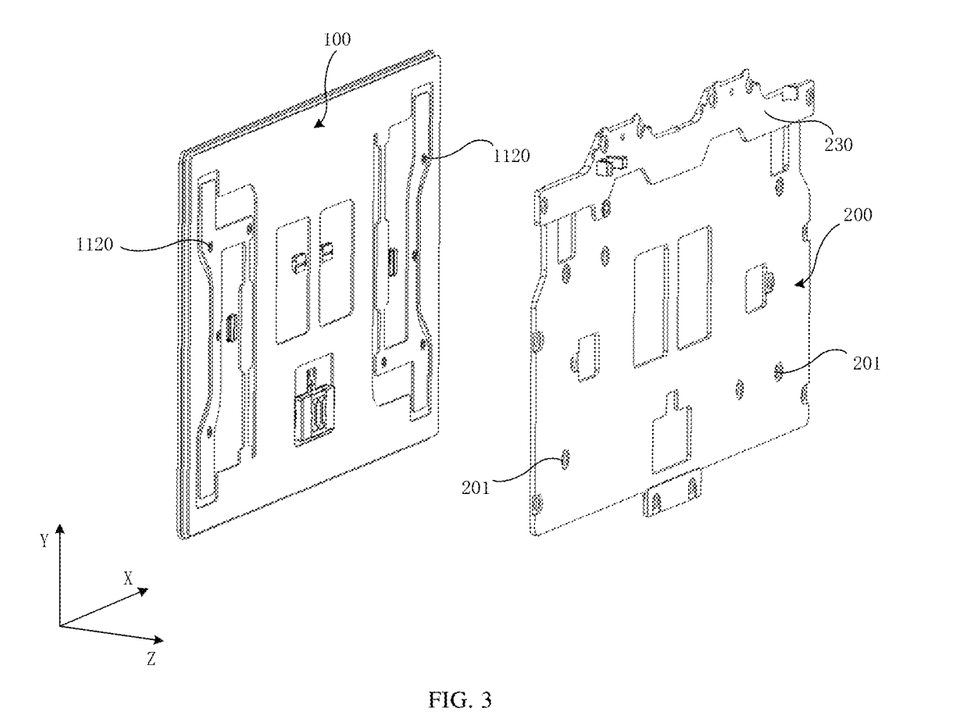
FIG. 3 is a schematic structural diagram of a pressure touch pad assembly provided in an embodiment of the present disclosure.

FIG. 3 is a schematic structural diagram of a pressure touch pad assembly provided in an embodiment of the present disclosure. Referring to FIG. 3, the present embodiment further provides a pressure touch pad assembly, including a touch pad 100 and a module fixing bracket 200. The touch pad 100 is installed on the module fixing bracket 200 along a first direction Z. The touch pad 100 is specifically fixedly connected to the module fixing bracket 200 through the non-reinforced region 112 of the pressure sensor bracket 110. The non-reinforced region 112 in the touch pad 100 may be connected and fixed to the module fixing bracket 200 through a fastener such as a screw. The module fixing bracket 200 may be a part of a case of an electronic device, such as a housing D of the electronic device, and is configured to fixedly connect the touch pad 100 to the electronic device, thereby providing support for the touch pad 100, and limiting the sinkage and deformation amount of the pressure touch pad 100 after being pressed. The module fixing bracket 200 may further include a module support bracket 230. The module support bracket 230 may be connected to one side of the module fixing bracket 200 away from the pressure touch pad module 100 through a fastener such as a screw, to improve the supporting force that can be provided by the module fixing bracket 200, and further limit the sinkage and deformation amount of the touch pad 100 after being pressed, thereby improving the user experience.

Figure 4:
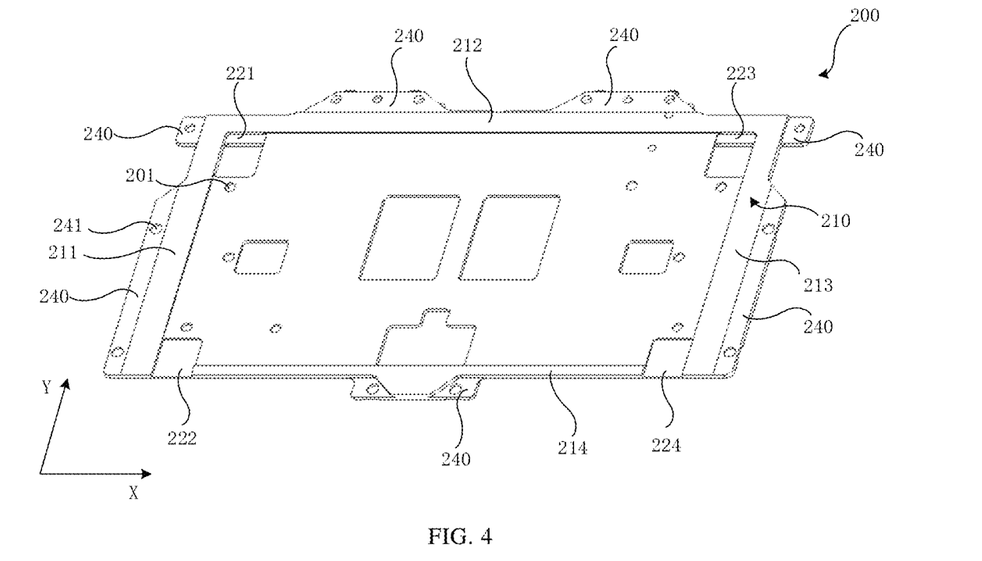
FIG. 4 is a schematic structural diagram of a module fixing bracket provided in an embodiment of the present disclosure.

FIG. 4 is a schematic structural diagram of a pressure fixing bracket 200 provided in an embodiment of the present disclosure. Referring to FIG. 4, a limiting protrusion 210 is provided on one side of the module fixing bracket 200 facing the pressure sensor bracket 110. Along a first direction Z, a thickness of the limiting protrusion 210 is smaller than a thickness of an elastic gasket 160 in a free state. Therefore, when the elastic gasket 160 is in the free state, there is a gap between the module fixing bracket 200 and the touch pad 100, which improves pressuring hand feel of a finger in the first direction Z while ensuring the detection accuracy of the pressure sensor 170. Further, due to the existence of the limiting protrusion 210, a distance that the touch pad 100 moves towards one side of the module fixing bracket 200 is limited, that is, the depth of sinkage of the touch pad 100 is limited, thereby preventing the touch pad 100 from moving too far towards one side of the module fixing bracket 200 when the touch pad 100 is pressed, which is conductive to improving the user experience.

In an implementation, the limiting protrusion 210 may be provided close to an outer peripheral side of the module fixing bracket 200, so that when the finger presses the upper surface of the cover plate 130, the limiting protrusion 210 can abut against the outer peripheral side of the pressure sensor bracket 110, to limit the distance that the touch pad 100 moves towards one side of the module fixing bracket 200, and prevent the touch pad 100 from collapse when being pressed. With the arrangement of the limiting protrusion 210 close to the outer peripheral side of the module fixing bracket 200, the limiting protrusion 210 can be further used to reinforce the strength of the module fixing bracket 200 itself, and improve the rigidity of the module fixing bracket 200. The improvement of the rigidity of the module fixing bracket 200 can reduce the deformation amount of the touch pad 100 after being pressed, which is also conductive to limiting the distance that the touch pad 100 moves towards one side of the module fixing bracket 200. Further, the limiting protrusion 210 provided on the outer peripheral side of the module fixing bracket 200 can be kept away from a connection between the non-reinforced region 212 and the module fixing bracket 200, to facilitate better position limiting.

In a possible implementation, the limiting protrusion 210 in the present embodiment includes a plurality of protruding parts, among which, two adjacent protruding parts are connected to each other, or at least two adjacent protruding parts are spaced apart. In a plane perpendicular to the first direction Z, a pattern enclosed by the plurality of protruding parts is similar to an outer contour of the module fixing bracket 200. Through the above arrangement, protruding parts can be provided at various positions close to the module fixing bracket 200, thereby better limiting the distance that the touch pad 100 moves towards one side of the module fixing bracket 200.

Further, the plurality of protruding parts in the present embodiment include a first protruding part 211, a second protruding part 212, a third protruding part 213, and a fourth protruding part 214. The first protruding part 211, the second protruding part 212, the third protruding part 213, and the fourth protruding part 214 roughly enclose a pattern of a cuboid shape. The first protruding part 211 and the third protruding part 213 extend along a second direction Y, and the second protruding part 212 and the fourth protruding part 214 extend along a third direction X.

With reference to the drawings, it can be understood that in the present embodiment, the first protruding part 211, the second protruding part 212, and the third protruding part 213 are sequentially connected end to end, the first protruding part 211, the second protruding part 212, and the third protruding part 213 form a pattern similar to a "door frame"; and the fourth protruding part 214 is spaced apart from the first protruding part 211 and the third protruding part 213. The spacing apart refers to a non-connected state between the fourth protruding part 214 and the first protruding part 211 and between the fourth protruding part 214 and the third protruding part 213.

In some embodiments, along the first direction Z, the thickness of the limiting protrusion 210 in the present embodiment is 0.25-0.35 mm. That is, the limiting protrusion 210 can ensure that there is a gap of at least 0.25-0.35 mm between the touch pad 100 and the module fixing bracket 200, thereby preventing the touch pad 100 from moving too far away from one side of the module fixing bracket 200 when the finger presses the touch pad 100 while ensuring the detection accuracy of the pressure sensor 170, and preventing the touch pad 100 from collapse.

In an implementation, the module fixing bracket 200 in the present embodiment is provided with a plurality of first connection holes 201 for fixedly connecting the touch pad 100 to the module fixing bracket 200; there is one-to-one correspondence between the plurality of first connection holes 201 and the plurality of non-reinforced region fixing holes 1120 in the non-reinforced region 112, and a fastener is, after running through one of the first connecting holes 201, fixed in a corresponding non-reinforced region fixing hole 1120 thereamong. In the present embodiment, specific numbers of the non-reinforced region fixing holes 1120 and the first connection holes 201 may be set based on actual requirements. For example, eight non-reinforced region fixation holes 1120 and eight first connection holes 201 may be provided. The fastener may be, for example, a fastening screw, and the corresponding non-reinforced region fixing hole 1120 is connected and fixed to the first connection hole 201 through the fastening screw, thereby improving the fixation stability of the touch pad 100 on the module fixing bracket 200.

The module fixing bracket 200 in the present embodiment is provided with limiting grooves corresponding to cantilever beams; and the limiting grooves are located in an area enclosed by the first protruding part 211, the second protruding part 212, the third protruding part 213, and the fourth protruding part 214. With the above arrangement, there is no gap in a main body region of the module fixing bracket 200, which is conductive to improving the strength of the module fixing bracket 200.

Specifically, the limiting grooves in the present embodiment include a first limiting groove 221 arranged close to a connection between the first protruding part 211 and the second protruding part 212 of the limiting protrusion 210, a second limiting groove 222 arranged between the first protruding part 211 and the fourth protruding part 214, a third limiting groove 223 arranged close to a connection between the second protruding part 212 and the third protruding part 213, and a fourth limiting groove 224 arranged between the third protruding part 213 and the fourth protruding part 214. In the first direction Z, the first limiting groove 221 overlaps with a free end of the first cantilever beam 11213, the second limiting groove 222 overlaps with a free end of the second cantilever beam 11214, the third limiting groove 223 overlaps with a free end of the third cantilever beam 11223, and the fourth limiting groove 224 overlaps with a free end of the fourth cantilever beam 11224. With the above arrangement, the first limiting groove 221, the second limiting groove 222, the third limiting groove 223, and the fourth limiting groove 224 can be configured to limit the first cantilever beam 11213, the second cantilever beam 11214, the third cantilever beam 11223, and the fourth cantilever beam 11224 respectively, thereby preventing the cantilever beams from moving too far towards one side of the module fixing bracket 200 when the touch pad is pressed.

In an implementation, the module fixing bracket 200 further includes a module support bracket 230. The module support bracket 230 is arranged on one side of the module fixing bracket 200 away from the pressure touch pad 100, and is located at one end of the module fixing bracket 200. For example, as shown in FIG. 3, the module support bracket 230 roughly extends along the third direction X, and the module support bracket 230 is arranged at one end of the module fixing bracket 200 along the second direction Y. The module support bracket 230 can improve the support strength of the module fixing bracket 200, and is conducive to improving the local rigidity of the module fixing bracket 200.

In the present embodiment, the module support bracket 230 and other parts of the module fixing bracket 200 may be integrally formed, thereby further improving the rigidity of the module fixing bracket 200. The module support bracket 230 and the module fixing bracket 200 may be integrated by, for example, die casting molding or computer digital control of precision machining. By integrated forming of the module support bracket 230 and other parts of the module fixing bracket 200, fasteners used to connect the two in the related art can be further omitted, which is conducive to reducing the number of fasteners.

Further, in the present embodiment, the module fixing bracket 200 is a duralumin bracket or a superduralumin bracket; and the module support bracket 230 is a duralumin bracket. Selection of the duralumin or superduralumin material is conductive to improving the strength of the module fixing bracket 200 and the module supporting bracket 230 themselves.

To sum up, in the present embodiment, the limiting protrusion 210 is provided on one side of the module fixing bracket 200 facing the pressure sensor bracket 210, thereby limiting the distance that the pressure touch pad moves towards one side of the module fixing bracket 200, that is, limiting the depth of sinkage of the pressure touch pad 100, and preventing the pressure touch pad 100 from moving too far towards one side of the module fixing bracket 200 when the pressure touch pad is pressed, which is conductive to improving the user experience, and preventing the touch pad from collapse when being pressed. Improvement of the structure of the module fixing bracket 200 itself and improvement of the material of the module fixing bracket 200 are conductive to improving the rigidity of the module fixing bracket 200 itself, reducing the deformation amount generated when the touch pad is pressed, and further reducing the sinkage and deformation amount of the pressure touch pad after being pressed.

Figure 5:
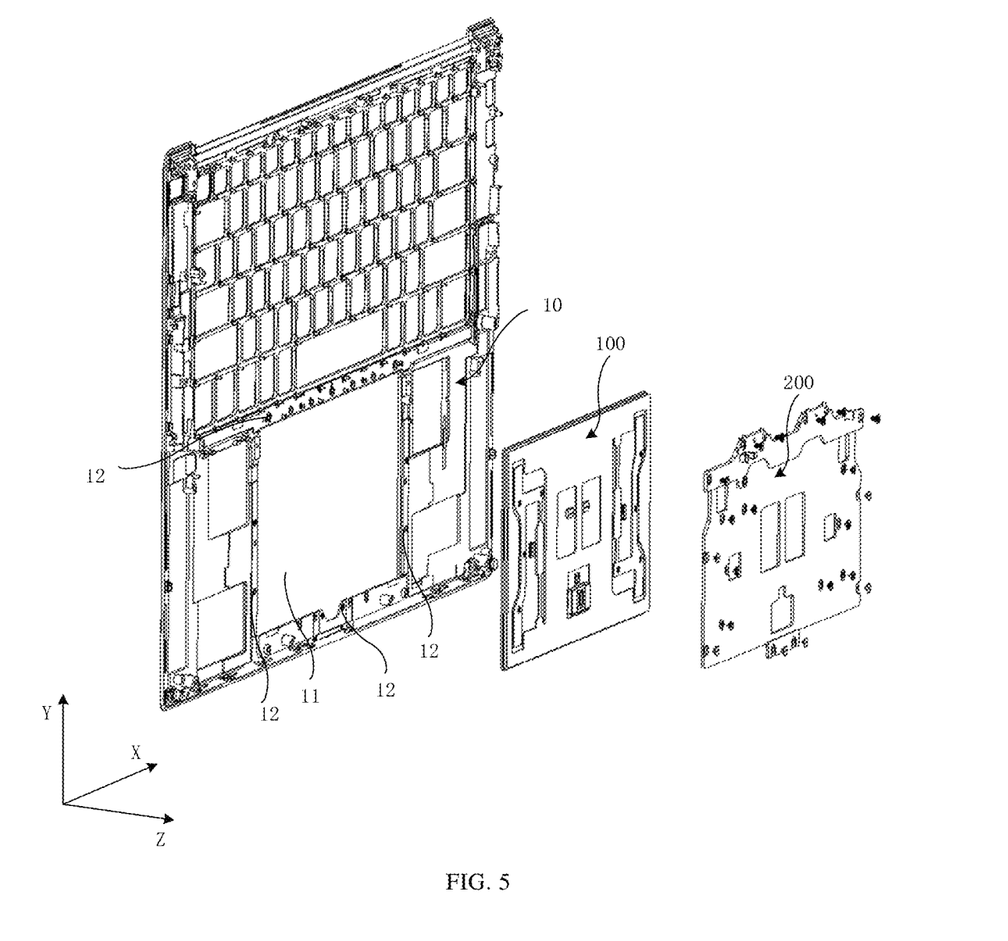
FIG. 5 is a schematic structural diagram of an electronic device provided in an embodiment of the present disclosure.

In an embodiment, with reference to FIGS. 4 and 5, the module fixing bracket 200 in the present embodiment may further include a plurality of mounting parts 240. The plurality of mounting parts 240 are each located on the outer peripheral side of the limiting protrusion 210. The mounting part 240 is connected and fixed to a part of a housing C 10 close to a mounting port 11. Optionally, a plurality of case fixing holes 12 are provided on the part of the housing C 10 close to the mounting port 11, each of the mounting parts 240 is provided with at least one second connection hole 241, and one of the fasteners is, after running through the second connection hole 241, fixed in a corresponding case fixing hole 12 among the plurality of case fixing holes. Through the above method, the module fixing bracket 200 is fixedly connected to the housing C 10.

The pressure touch pad 100 is fixed to the module fixing bracket 200, and when the cover plate 130 in the pressure touch pad 100 is pressed, the touch pad 100 can move relative to the module fixing bracket 200 in the first direction Z. The limiting protrusion 210 is provided on the module fixing bracket 200, thereby limiting the distance that the cover plate 130 moves towards one side of the module fixing bracket 200, that is, limiting the depth of sinkage of the touch pad 100, and preventing the pressure touch pad from moving too far towards one side of the module fixing bracket 200 when the touch pad 100 is pressed, which is conductive to improving the user experience.

FIG. 5 is a schematic structural diagram of an electronic device provided in an embodiment of the present disclosure. Referring to FIG. 5, the present embodiment further provides an electronic device, including a housing C 10. A mounting port 11 is provided on the housing C 10, and the above pressure touch pad assembly is provided in the mounting port 11.

Figure 6:
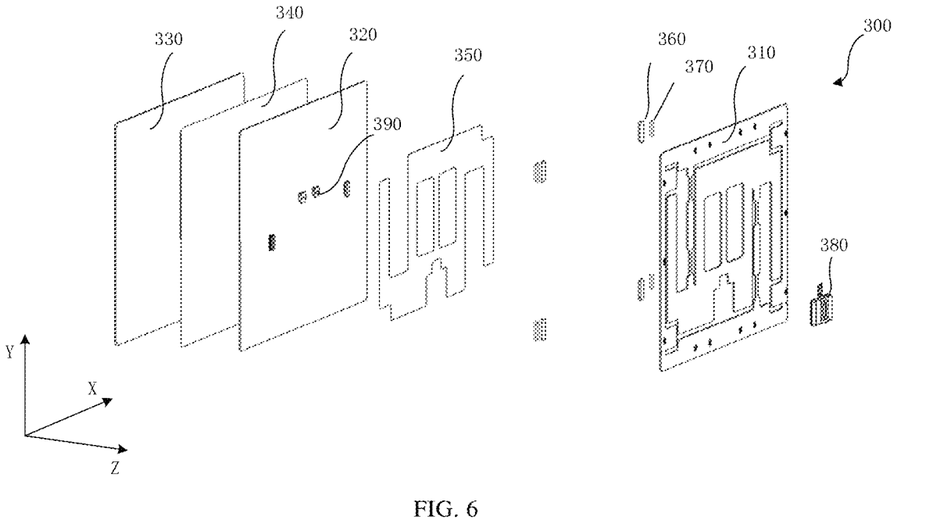
FIG. 6 is an exploded view of a pressure touch pad provided in another embodiment of the present disclosure.
Figure 7:
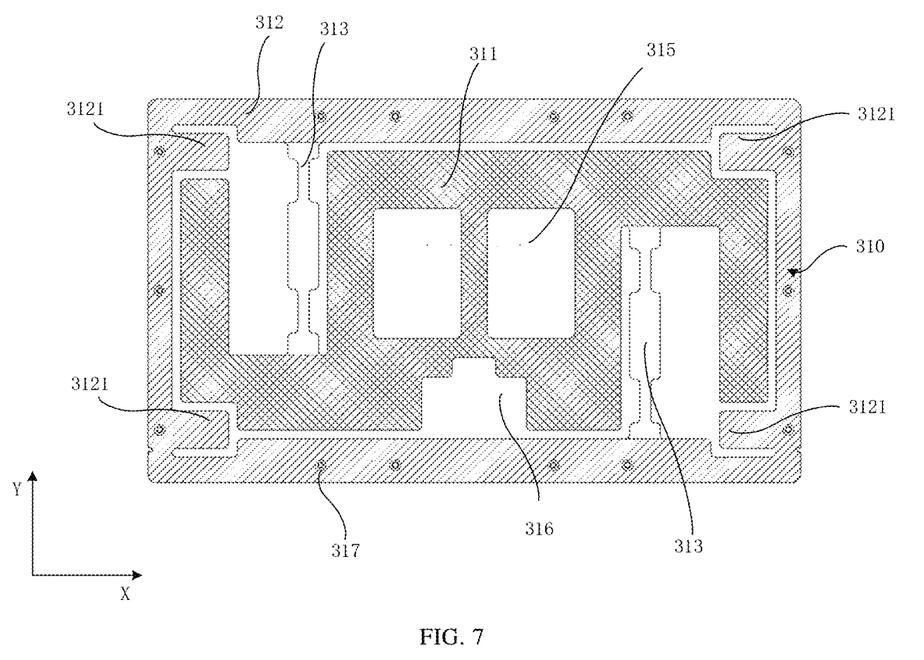
FIG. 7 is a schematic structural diagram of a pressure sensor bracket provided in another embodiment of the present disclosure.

The present disclosure further provides a touch pad in another embodiment. Referring to FIGS. 6-7, FIG. 6 is an exploded view of a pressure touch pad module; and FIG. 7 is a schematic structural diagram of a pressure sensor bracket. The pressure touch pad 300 includes a cover plate 330, a printed circuit board 320, a pressure sensor 370, and a pressure sensor bracket 310 that are sequentially arranged along a first direction Z. The printed circuit board 320 is fixedly connected to the cover plate 330 through a first adhesive layer 340; the pressure sensor bracket 310 is provided with a reinforced region 311, a non-reinforced region 312, and a flexible arm 313. The non-reinforced region 312 is located on an outer peripheral side of the pressure sensor bracket 310. The reinforced region 311 is located in a center part of the pressure sensor bracket 310 and is surrounded by the non-reinforced region 312. The flexible arm 313 is connected to the reinforced region 311 and the non-reinforced region 312. The non-reinforced region 312 is fixedly connected to an outer case. For example, the outer case includes a module fixing bracket. The reinforced region 311 is fixedly connected to the printed circuit board 320 through a second adhesive layer 350.

A plurality of cantilever beams 3121 are further provided in the non-reinforced region 312. For example, in the present embodiment, four cantilever beams 3121 are provided. The non-reinforced region 312 roughly assumes a cuboid shape, the four cantilever beams 3121 all extend towards an inner side of the pressure sensor bracket 310, and the four cantilever beams 3121 are arranged close to four corners of the pressure sensor bracket 310 respectively. Each of the cantilever beams 3121 is connected to the printed circuit board through an elastic gasket 360.

Through the above arrangement, the pressure sensor bracket 310 in the present embodiment can be fixedly connected to the printed circuit board 320 through the reinforced region 311, and fixedly connected to the outer case through the non-reinforced region 312, and the reinforced region 311 is connected to the non-reinforced region 312 using the flexible arm 313, thereby enabling the pressure sensor bracket 310 to have better rigidity and strength, and reducing the sinkage amount of the pressure touch pad when being pressed by a finger, which is conductive to improving the user experience. Compared with the last embodiment, in the embodiment of the present disclosure, the touch pad 300 is prevented from collapse to a certain extent.

Figure 8:
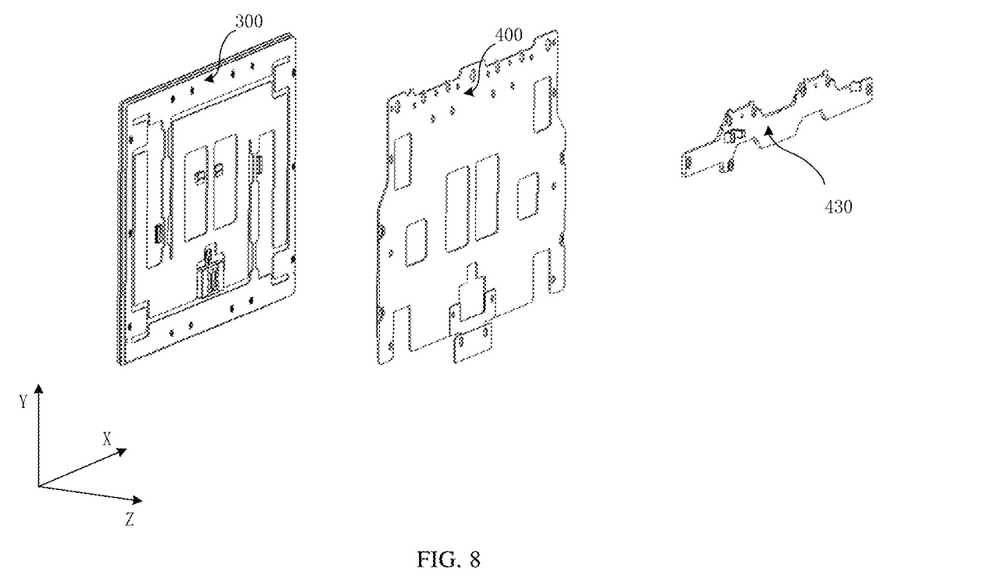
FIG. 8 is a schematic structural diagram of a pressure touch pad assembly provided in another embodiment of the present disclosure.

FIG. 8 is a schematic structural diagram of a pressure touch pad assembly provided in an embodiment of the present disclosure. Referring to FIG. 8, the pressure touch pad assembly includes a pressure touch pad 300, a module fixing bracket 400, and a module support bracket 430. Along a first direction Z, the pressure touch pad 300 is installed on the module fixing bracket 400, and the module support bracket 430 is installed on one side of the module fixing bracket 400 away from the pressure touch pad 300. The non-reinforced region 312 in the pressure touch pad 300 can be connected and fixed to the module fixing bracket 400 through a fastener such as a screw; and the module fixing bracket 400 is connected to an electronic device as a case of the electronic device, thereby providing support for the pressure touch pad 300. The module support bracket 430 can be connected to one side of the module fixing bracket 400 away from the pressure touch pad 300 through a fastener such as a screw, to improve the supporting force that can be provided by the module fixing bracket 400.

In the present embodiment, the existence of the module fixing bracket 400 and the module support bracket 430 can further limit the sinkage and deformation amount of the pressure touch pad after being pressed, which is conductive to improving the user experience.

Figure 9:
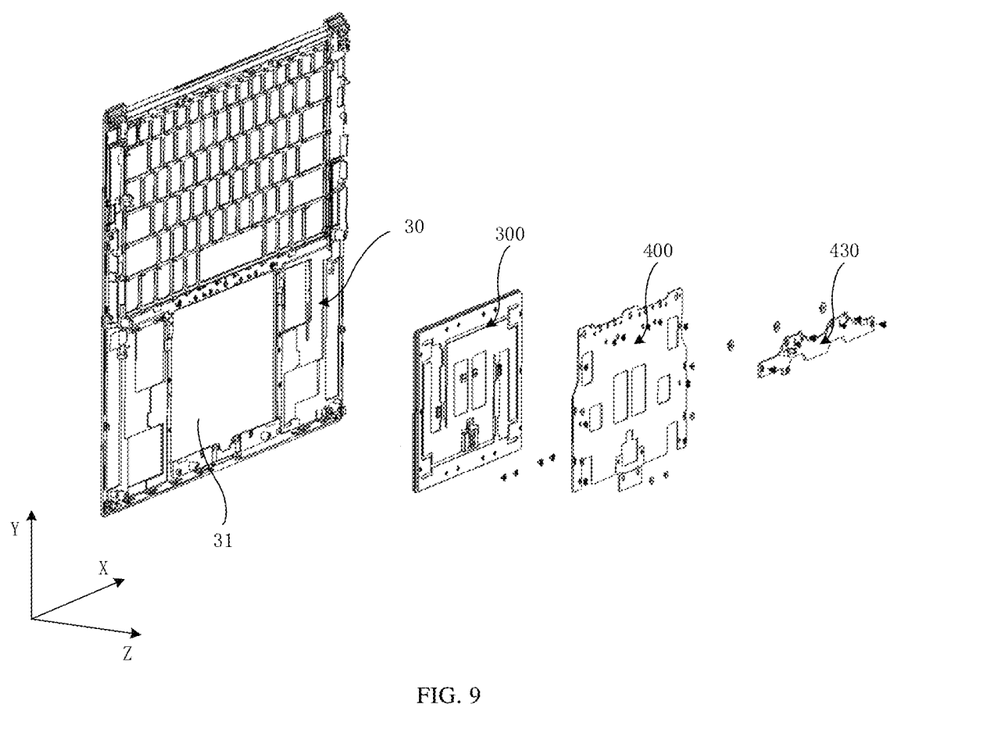
FIG. 9 is a schematic structural diagram of an electronic device provided in an embodiment of the present disclosure.

FIG. 9 is a schematic structural diagram of an electronic device provided in an embodiment of the present disclosure. Referring to FIG. 9, the present embodiment further provides an electronic device, including a housing C 30. A mounting port 31 is provided on the housing C 30, and the pressure touch pad assembly in the above embodiments is provided in the mounting port 31.

Specifically, the module fixing bracket 400 may be connected and fixed to the housing C 30 through a fastener such as a screw, and the pressure touch pad 300 and the module support bracket 430 are fixed to the module fixing bracket 400 on both sides of the first direction Z respectively.

Since the pressure touch pad assembly in the above embodiments is used in the electronic device in the present embodiment, the pressure touch pad has a small sinkage and deformation amount after being pressed, which is conductive to improving the user experience.

Specifically, the electronic device in the present embodiment may be, for example, a portable or mobile computing device, such as a terminal device, a mobile phone, a tablet computer and a keyboard thereof, a notebook computer, a desktop computer, a game device, a vehicle electronic device, or a wearable smart device, or may be other electronic devices, such as an electronic database, an automobile, or an automated teller machine (ATM) of a bank. The wearable smart device includes a device that has complete functions and a large size, and can realize complete or partial functions without relying on a smart phone, such as a smart watch or smart glasses, and includes a device that only focuses on a certain type of application functions and needs to be used in cooperation with other devices such as a smart phone, for example, various smart bracelets and smart jewelries for monitoring physical signs.

In the description of the present disclosure, it should be noted that, unless otherwise explicitly stipulated and defined, the term "mounting," "connected," or "connection" should be understood in a broad sense, for example, may be a fixed connection, or may be an indirect connection through an intermediate medium, or may be an internal communication between two elements or an interaction relationship between two elements. For those of ordinary skills in the art, the specific meanings of the above terms in the present disclosure may be understood based on specific circumstances.

In the description of the present disclosure, it should be understood that the directions or position relationships indicated by the terms, such as "above," "below," "in front of," "behind," "vertical," "horizontal," "top," "bottom," "inner," and "outer," are based on the directions or position relationships shown in the drawings, are only provided to facilitate describing the present disclosure and simplifying the description, rather than indicating or implying that the apparatus or element referred to must have a particular direction, or be constructed and operated in a particular direction, and therefore cannot be construed as limiting the present disclosure. In the description of the present disclosure, "plurality" refers to two or more than two, unless otherwise accurately and specifically stipulated.

The terms, such as "first," "second," "third," and "fourth" (if present), in the description, the claims, and the above drawings of the present disclosure are used to distinguish between similar objects, and do not necessarily mean to limit a particular sequence or a sequential order. It should be understood that the data used in such a way is interchangeable under appropriate circumstances so that the embodiments of the present disclosure described herein can, for example, be implemented in a sequence other than those illustrated or described herein. The terms "comprising" and "having", as well as any variations thereof, are intended to encompass non-exclusive inclusions. For example, processes, methods, systems, products, or devices that include a series of steps or units are not necessarily limited to the explicitly listed steps or units, but may include other steps or units that are not explicitly listed or are inherent to these processes, methods, products, or devices.

Finally, it should be noted that: the above embodiments are merely used to illustrate the technical solutions of the present disclosure, instead of imposing any limitation on the technical solutions. While the present disclosure is described in detail with reference to the above embodiments, those of ordinary skills in the art should understand that: the technical solutions disclosed in the above embodiments may still be modified or a part or all of the technical features thereof may be replaced equivalently. These modifications or replacements are not intended to make the essence of corresponding technical solutions depart from the scope of the technical solutions of the embodiments of the present disclosure.

What is claimed is:

1. A pressure touch pad, comprising a printed circuit board, a pressure sensor, a pressure sensor bracket, and a touch controller; wherein
the printed circuit board is stacked along a first direction on the pressure sensor bracket, a touch electrode layer is provided on one side of the printed circuit board away from the pressure sensor bracket, and the touch electrode layer is configured to, when a finger touches or presses the pressure touch pad, sense a touch position of the finger and output a corresponding touch sensing signal, wherein the first direction is a direction perpendicular to a plane of the pressure touch pad;
the pressure sensor is arranged between the printed circuit board and the pressure sensor bracket, and is configured to, when the finger presses the pressure touch pad, deform and output a corresponding pressure sensing signal;
the touch controller is arranged on one side of the printed circuit board facing the pressure sensor bracket, the touch controller is electrically connected to the touch sensor and the pressure sensor respectively, and the touch controller is configured to receive the touch sensing signal and the pressure sensing signal, and determine the touch position of the finger on the touch pad and a magnitude of a pressure applied by the finger; and
the pressure sensor bracket is configured to bear the printed circuit board and the pressure sensor, and fixedly connect the pressure touch pad to an outer case; wherein the pressure sensor bracket comprises a reinforced region, a non-reinforced region, and a flexible arm, the reinforced region is fixedly connected to the printed circuit board, the non-reinforced region is configured to be fixedly connected to the outer case, the flexible arm is connected to the reinforced region and the non-reinforced region; the non-reinforced region is provided with a plurality of cantilever beams, the pressure sensor is provided on one side of the cantilever beams facing the printed circuit board, and the cantilever beam is connected to the printed circuit board through an elastic gasket.

2. The pressure touch pad according to claim 1, wherein in a plane perpendicular to the first direction, a projection of the reinforced region is a closed structure, and the reinforced region is arranged around an outer side of the non-reinforced region.

3. The pressure touch pad according to claim 2, wherein an area of the reinforced region is at least 75% of an area of the pressure sensor bracket.

4. The pressure touch pad according to claim 3, wherein the pressure sensor bracket is provided with a first opening part and a second opening part, and the non-reinforced region comprises a first non-reinforced region arranged in the first opening part and a second non-reinforced region arranged in the second opening part;
the flexible arm comprises a first flexible arm arranged in the first opening part and a second flexible arm arranged in the second opening part; and
two ends of the first flexible arm are connected to the first non-reinforced region and the reinforced region respectively, and two ends of the second flexible arm are connected to the second non-reinforced region and the reinforced region respectively.

5. The pressure touch pad according to claim 4, wherein the first non-reinforced region comprises a first connecting plate and a second connecting plate, the first connecting plate extends along a third direction, the second connecting plate extends along a second direction; one end of the first connecting plate facing an outer peripheral side of the pressure sensor bracket is connected to the second connecting plate, the other end of the first connecting plate is connected to the first flexible arm; the second non-reinforced region comprises a third connecting plate and a fourth connecting plate, the third connecting plate extends along the third direction, the fourth connecting plate extends along the second direction; one end of the third connecting plate facing the outer peripheral side of the pressure sensor bracket is connected to the fourth connecting plate, and the other end of the third connecting plate is connected to the second flexible arm;
wherein the third direction is a direction along a long side of the pressure touch pad, and the second direction is a direction along a short side of the pressure touch pad.

6. The pressure touch pad according to claim 5, wherein the plurality of cantilever beams comprise a first cantilever beam, a second cantilever beam, a third cantilever beam, and a fourth cantilever beam,
two ends of the second connecting plate are configured to form the first cantilever beam and the second cantilever beam respectively; and
two ends of the fourth connecting plate are configured to form the third cantilever beam and the fourth cantilever beam respectively.

7. The pressure touch pad according to claim 6, wherein the non-reinforced region comprises a first fixing hole, a second fixing hole, a fourth fixing hole, and a fifth fixing hole;
in the first non-reinforced region, the first fixing hole is provided at one end of the second connecting plate to form a fixed end of the first cantilever beam, and the second fixing hole is provided at the other end of the second connecting plate to form a fixed end of the second cantilever beam; and
in the second non-reinforced region, the fourth fixing hole is provided at one end of the fourth connecting plate to form a fixed end of the third cantilever beam, and the fifth fixing hole is provided at the other end of the four connecting plate to form a fixed end of the fourth cantilever beam.

8. The pressure touch pad according to claim 7, wherein the non-reinforced region further comprises a third fixing hole and a sixth fixing hole;
in the first non-reinforced region, the third fixing hole is provided at one end of the first connecting plate connected to the first flexible arm; and
in the second non-reinforced region, the sixth fixing hole is provided at one end of the third connecting plate connected to the second flexible arm.

9. The pressure touch pad according to claim 1, wherein the pressure sensor bracket is a stainless steel bracket with a hardness of ¾.

10. The pressure touch pad according to claim 1, wherein the pressure touch pad further comprises:
an actuator, wherein the actuator comprises a linear motor, an actuator avoidance hole is provided at a center of the pressure sensor bracket, and the actuator avoidance hole is used to avoid the actuator; and
a cover plate, wherein the cover plate is stacked along the first direction on one side of the printed circuit board away from the pressure sensor bracket, the cover plate and the printed circuit board are adhesively fixed through a first adhesive layer, and the printed circuit board and the reinforced region are adhesively fixed through a second adhesive layer.

11. A pressure touch pad assembly, comprising a module fixing bracket and the pressure touch pad according to claim 1, the pressure touch pad being installed along the first direction on the module fixing bracket.

12. The pressure touch pad assembly according to claim 11, wherein a limiting protrusion is provided on one side of the module fixing bracket facing the pressure sensor bracket, and along the first direction, a thickness of the limiting protrusion is smaller than a thickness of the elastic gasket in a free state.

13. The pressure touch pad assembly according to claim 12, wherein the limiting protrusion is provided on an outer peripheral side of the module fixing bracket.

14. The pressure touch pad assembly according to claim 13, wherein the limiting protrusion comprises a plurality of protruding parts, and at least two adjacent protruding parts among the plurality of protruding parts are connected to each other, or at least two adjacent protruding pars among the plurality of protruding parts are spaced apart.

15. The pressure touch pad assembly according to claim 14, wherein the plurality of protruding parts comprise a first protruding part, a second protruding part, a third protruding part, and a fourth protruding part, the first protruding part and the third protruding part extend along the second direction, and the second protruding part and the fourth protruding part extend along the third direction; the first protruding part, the second protruding part, and the third protruding part are sequentially connected end to end, and the fourth protruding part is spaced apart from the first protruding part and the third protruding part.

16. The pressure touch pad assembly according to claim 15, wherein the module fixing bracket is provided with a limiting groove corresponding to the cantilever beam; and the limiting groove is located within an area enclosed by the first protruding part, the second protruding part, the third protruding part, and the fourth protruding part.

17. The pressure touch pad assembly according to claim 12, wherein along the first direction, the thickness of the limiting protrusion is 0.25-0.35 mm.

18. The pressure touch pad assembly according to claim 11, wherein the pressure touch pad assembly further comprises a module support bracket, the module support bracket is arranged on one side of the module fixing bracket away from the pressure touch pad and is located at one end of the module fixing bracket; and the module support bracket is integrally formed with the module fixing bracket.

19. The pressure touch pad assembly according to claim 11, wherein a plurality of first fixing holes are provided in the non-reinforced region, a plurality of first connection holes are provided on the module fixing bracket, there is one-to-one correspondence between the plurality of first fixing holes and the plurality of first connection holes, and a fastener is, after running through a corresponding first connection holes, fixed in a corresponding first fixing hole.

20. An electronic device, comprising a housing C, wherein a mounting port is provided on the housing C, and the pressure touch pad assembly according to claim 11 is provided in the mounting port.

* * * * *